United States Patent
Beguet et al.

(10) Patent No.: US 7,903,500 B2
(45) Date of Patent: Mar. 8, 2011

(54) DEVICE FOR LOCALIZING ACOUSTIC SOURCES AND MEASURING THEIR INTENSITIES

(75) Inventors: Bernard Beguet, Saint Bel (FR); Lucille Lamotte, Lachassagne (FR)

(73) Assignee: Airbus France, Toulouse (FR)

( * ) Notice: Subject to any disclaimer, the term of this patent is extended or adjusted under 35 U.S.C. 154(b) by 1091 days.

(21) Appl. No.: 11/652,533

(22) Filed: Jan. 12, 2007

(65) Prior Publication Data

US 2007/0172078 A1 Jul. 26, 2007

(30) Foreign Application Priority Data

Jan. 18, 2006 (FR) .................................... 06 00452

(51) Int. Cl.
*H04R 3/00* (2006.01)
(52) U.S. Cl. ............................................. 367/124; 367/8
(58) Field of Classification Search .................. 367/124, 367/8; 381/92
See application file for complete search history.

(56) References Cited

U.S. PATENT DOCUMENTS

| 7,817,804 | B2* | 10/2010 | Beguet | 367/118 |
| 2003/0214881 | A1 | 11/2003 | Yang | |
| 2005/0163330 | A1* | 7/2005 | Beguet | 381/92 |
| 2007/0172078 | A1* | 7/2007 | Beguet et al. | 381/92 |

FOREIGN PATENT DOCUMENTS

FR 2896314 A1 * 7/2007

OTHER PUBLICATIONS

Musha et al., "Adaptive Signal Processing for Reducing Nearby Generated Flow Noise," Applied Acoustics, vol. 66, pp. 1206-1217, 2005.
Davidsen et al., "Sparse Geometrics for Two-Dimensional Array Transducers in Volumetric Imaging," Ultrasonics Symposium, pp. 1091-1094, 1993.
MacPhic, "Thinned Coincident Arrays for the Direct Measurement of the Principal Solution in Radio Astronomy," IEEE Transactions on Antennas and Propagation, vol. 51, No. 4, pp. 788-793.
Piet et al., "Localization Of The Acoustic Sources Of The A340 With A Large Phased Microphone Array during Flight Tests," American Institute of Aeronautics and Astronautics, Inc., vol. 2, pp. 1189-1199, 2002.

* cited by examiner

*Primary Examiner* — Dan Pihulic
(74) *Attorney, Agent, or Firm* — Oliff & Berridge, PLC

(57) ABSTRACT

The invention relates to a device for localizing acoustic sources and measuring their intensity comprising
an antenna having at least two sub-antennas, each sub-antenna having at least two branches disposed in a cross or star shape, each branch being equipped with a plurality of microphones, and
a system for processing the signals coming from the microphones,
the device being designed to establish, for a frequency higher than a given value $f_c$, an acoustic source hologram, i.e. a distribution of acoustic pressures or intensities at different computation points on a given surface.

12 Claims, 2 Drawing Sheets f > fc f < fc

DEVICE FOR LOCALIZING ACOUSTIC SOURCES AND MEASURING THEIR INTENSITIES

BACKGROUND

The present invention relates to a device for localizing acoustic sources and measuring their intensities.

Acoustic comfort appears to be a significant problem today, particularly in the case of residents living in urban areas or near an airport.

In order to abate vehicle noise, it is necessary to better understand the various acoustic phenomena occurring in the outer envelope of the vehicle. Certain areas of a vehicle appear to be the sources of harmful noise. For example, in the case of an aircraft, the engines and landing gear are areas particularly likely to emit noise. However, other areas may also be involved although their intensity is generally less.

Therefore, it is important to localize not only the high-intensity noise sources but also the lower-intensity sources. The precise location and measurement of their intensities then enable less-noisy systems, systems more adapted to daily life, to be developed.

Known measuring devices employ a microphone array and means for processing the signals coming from the various microphones. The usual signal processing method is to establish an acoustic source hologram, i.e., a distribution of acoustic pressures, or intensities, at various computation points on a given surface, creating, for each computation point in the hologram, the sum of the acoustic pressures measured by the microphones, taking into account the lag in acoustic pressure corresponding to the travel time between the computation point and a microphone.

The hologram, as described above, is made up of lobes corresponding to the positions of the acoustic sources, and lobes due to the limited size of the antenna. These are called main lobes and secondary lobes, respectively.

By means of these systems, the localized acoustic sources obtained have a resolution that is higher in proportion to the frequency, and to the size of the antenna that is composed of microphones.

However, problems arise in the case of sources emitting at high frequencies. In this case, the mesh size of the antenna, i.e., the microphone spacing, must be sufficiently small. If this is not the case, parasitic lobes known as image lobes appear on the hologram in addition to the real sources. To prevent such a phenomenon, the use of a large number of microphones is essential, increasing the costs of implementing such a device.

SUMMARY

To solve this problem, a device for localizing acoustic sources and measuring their intensity was developed, comprising a two-branch antenna. Such a device is described in particular in the article "Localization of the acoustic sources of the A 340 with a large phased microphone array during flight tests," J. F. Piet from Onera et al., AIAA 2002-2506. The branches are disposed in a cross shape and are each equipped with a plurality of microphones. This device also has a system for processing signals coming from the plurality of microphones enabling an acoustic source hologram to be established, i.e., a distribution of acoustic pressures, or intensities, at different computation points on a given surface, creating, for each calculation point in the hologram, the sum of the acoustic pressures measured by the plurality of microphone on a given branch and taking into account the acoustic pressure lag, then multiplying, for each computation point of the hologram, the pressure values obtained by adding the acoustic pressures measured by the plurality of microphones in a given branch.

This solution is useful in that it provides a good compromise between the resolution obtained and the number of microphones in the antenna. However, it has the drawback of causing the appearance, in the hologram, of secondary lobes that are high in intensity by comparison with the main lobes, and generating the appearance of extra lobes called phantom lobes. The phantom lobes appear because of multiplicative processing when there are several acoustic sources with different locations.

The goal of the present invention is to overcome these drawbacks. It relates to a device for localization of acoustic sources and measuring their intensities, comprising:

an antenna having at least two sub-antennas, each sub-antenna having at least two branches disposed in a cross shape or star shape, each branch being equipped with a plurality of microphones, and a signal processing unit that processes the signals coming from a plurality of microphones, to establish, for a frequency higher than a $f_c$, an acoustic source hologram, the acoustic source hologram representing a distribution of acoustic pressures or intensities at different computation points on a given surface, a calculation unit that calculates, for each computation point in the hologram, a sum of the acoustic pressures measured by the plurality of microphones in a given sub-antenna, and taking into account a lag in acoustic pressures corresponding to a travel time between the calculation point and the pluralities of microphones, and multiplying the pressure values obtained by adding the acoustic pressures measured by the plurality of microphones of the various sub-antennas, for each calculation point of the hologram.

This device limits the influence of parasites that can appear on the hologram. These parasites are secondary lobes, image lobes, and phantom lobes, each having lower intensities than the lobes defining the actual sources. Therefore, these actual source lobes are clearly demarcated on the hologram from the parasitic lobes, so that the actual acoustic sources can be more accurately localized.

Preferably, the sub-antennas are disposed in angularly offset parallel planes.

Advantageously, the device is designed to establish an acoustic source hologram, for a frequency less than the value $f_c$, calculating, for each computation point of the hologram, the sum of the acoustic pressures measured by the antenna microphones, taking the lag in acoustic pressures into account.

When there are several juxtaposed sub-antennas, the advantage of preserving additive processing over the microphone array for a frequency lower than $f_c$ is that of maintaining good resolution at low frequencies. This is because the resolution is associated with the total size of the antenna. Beyond $f_c$, multiplicative processing has the advantage of eliminating the image lobes. Moreover, the fact that additive processing is done for an antenna with several branches, and not on a single line as in the case of the reference cited above, considerably reduces phantom lobes.

It should be noted that when multiplicative processing is used, the resolution becomes proportional to the size of a single sub-antenna.

Thus, according to an exemplary embodiment of the invention, the device is designed to establish an acoustic source hologram, for a frequency less than the value $f_c$, calculating, for each computation point of the hologram, the sum of the acoustic pressures measured by the antenna microphones, taking the lag in acoustic pressures into account.

Additive processing of the signals coming from the antenna microphone array is accomplished alone, so that the necessary computations are considerably reduced.

According to one exemplary embodiment, the frequency value $f_c$ is equal to $(c \times D)/(p \times l)$ where c is the speed of sound, D is the distance between the object and the antenna, p is the distance between two microphones, and l is the length of the object to be analyzed.

Determination of the frequency value $f_c$ is a function of the accuracy, the microphone spacing, and the distance between the source to be localized and the microphones.

According to another exemplary embodiment, the branches of a given sub-antenna have a regular angular distribution and the sub-antennas are offset by an angle corresponding to a fraction of the angle between two branches.

This arrangement generally produces the greatest reduction in image lobes and secondary lobes.

Advantageously, the sub-antennas are offset by an angle corresponding to half the angle between two branches.

According to another exemplary embodiment of the invention, the processing system of the signals coming from the microphones is designed to process signals emitted by moving sources.

According to another exemplary embodiment, the branches of the sub-antennas are straight.

The branches can have between 7 and 30 microphones, giving a good compromise between the resolution obtained and the cost of implementing such a device.

Each of these branches are between 1 m and 20 m long, giving a good compromise between resolution and sub-antenna size.

According to another exemplary embodiment of the invention, the microphones are regularly distributed, giving better contrast.

Moreover, to reduce the costs of implementing the device, the microphones can be identical.

In any event, the invention will be understood with the aid of the description hereinbelow, with reference to the attached schematic drawings which show several exemplary embodiments of this device as non-limiting examples.

DETAILED DESCRIPTION OF EMBODIMENTS

Figure 1:
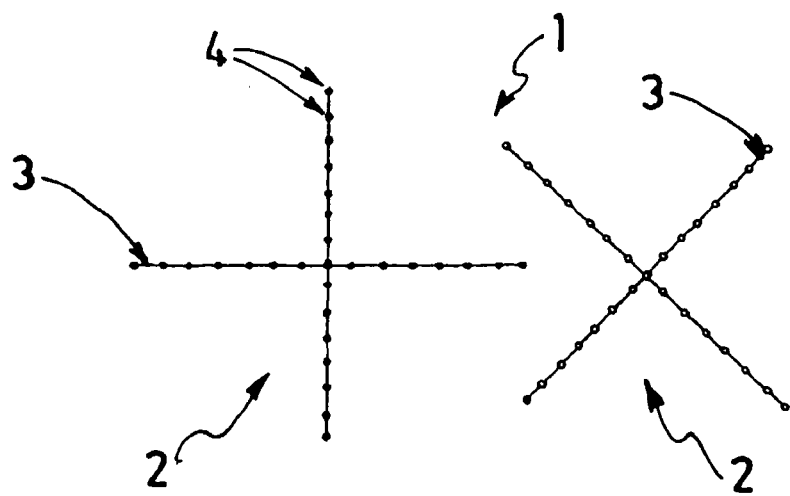
FIG. 1 is a top view of an antenna composed of two, two-branch sub-antennas, representing a first embodiment in which the two sub-antennas are juxtaposed.

FIG. 1 shows an antenna 1 composed of two juxtaposed sub-antennas 2, each sub-antenna 2 being composed of two branches 3. The latter are straight and disposed in a cross shape, the intersection being, for example, located essentially at the middle of each branch. The arrangement shown is that of a cross shape with an angle between the two branches of approximately 90°. Preferably, the two branches 3 are of identical lengths, the length of the branches being, for example, between 5 and 20 meters if one is interested in an aircraft approximately 100 meters above ground, or between 1 and 3 meters if one is interested in a vehicle passing by at 3 meters from the antenna.

The two sub-antennas 2 are disposed in coplanar planes. They are offset by an angle corresponding to half the angle between two branches, in this case equal to 45°.

The branches 3 support a plurality of microphones 4 enabling the sound emissions from the acoustic sources, also known as noise sources, to be recorded. A suitable number of microphones is between 7 and 30, and judiciously equal to 15.

Figure 2:
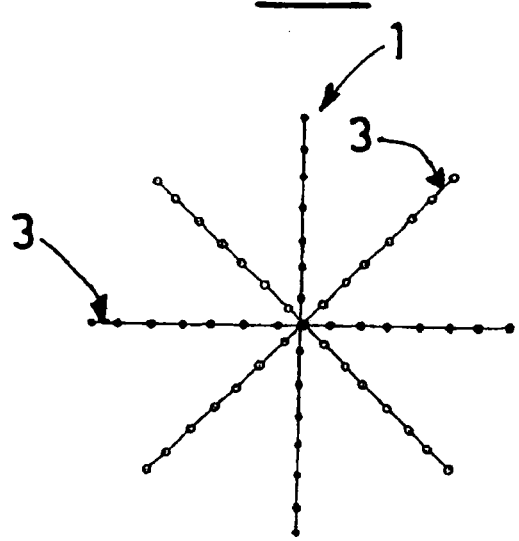
FIG. 2 is a top view of an antenna composed of two, two-branch sub-antennas, representing a second embodiment in which the two sub-antennas are coaxial.

FIG. 2 shows another embodiment in which the antenna 1 is composed of two sub-antennas 2 with two branches 3, the two sub-antennas being offset angularly by 45°. The latter form cross shapes of which the centers coincide.

Figure 3:
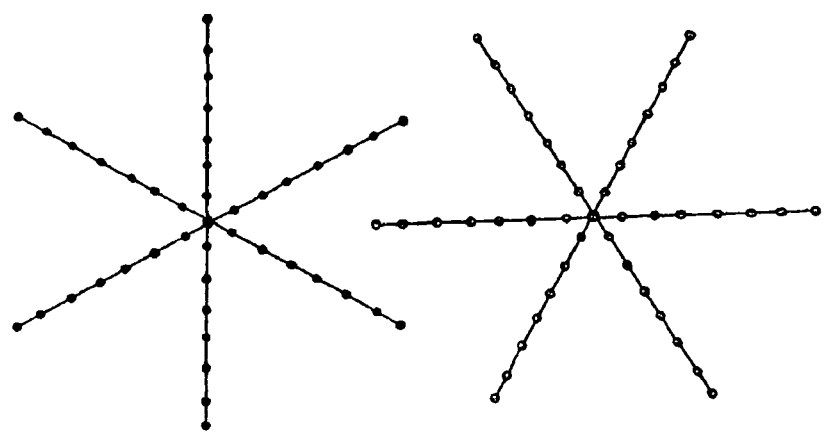
FIG. 3 is a top view of an antenna composed of two, three-branch sub-antennas, representing a third embodiment in which the two sub-antennas are juxtaposed.

FIG. 3 shows a third embodiment in which antenna 1 is composed of two star-shaped sub-antennas 2 with three branches 3, the two sub-antennas being offset angularly by 30°. The latter are coplanar and juxtaposed.

Figure 4:
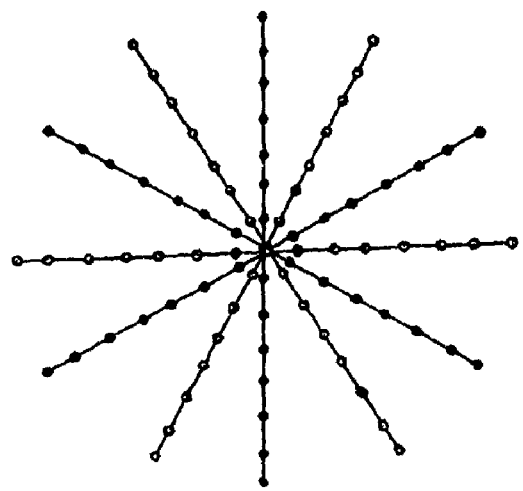
FIG. 4 is a top view of an antenna composed of two, three-branch sub-antennas , representing a fourth embodiment in which the two sub-antennas are coaxial.

Finally, FIG. 4 shows a fourth embodiment in which the antenna 1 is composed of two sub-antennas 2 with three branches 3, the two sub-antennas being offset angularly by 30°. The latter form star shapes whose centers coincide.

A large number of branches enables the localizing accuracy to be improved, but also increases the complexity of implementing such localization.

The localization device is thus composed of an antenna, preferably according to one of the variants proposed above, and a system for processing the signals coming from the microphones.

The antenna is placed at a distance from a fixed or moving source. In the case of localizing sound sources on an aircraft, for example, the antenna can be placed horizontally at ground level, and the aircraft makes one or more passes over the antenna at an altitude of approximately 100 meters.

Figure 5:
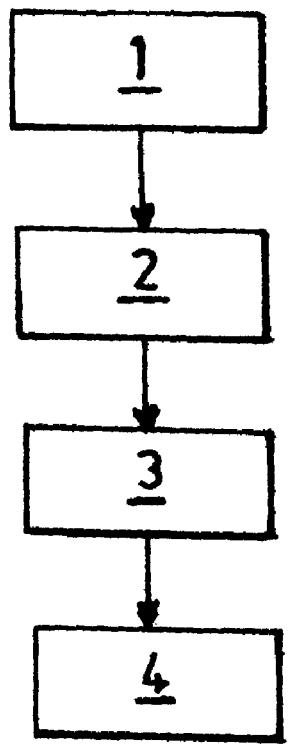
FIG. 5 is a block diagram showing the processing of the signals coming from the antenna microphones for a frequency higher than a given value $f_c$.

This arrangement enables an acoustic source hologram to be established for a frequency greater than a given value $f_c$, namely an acoustic pressure distribution, or intensity distribution, at various computation points on a given surface. For this purpose, according to FIG. 5, the acoustic pressures from the acoustic sources are picked up by the microphones of each sub-antenna (STEP 1), then the sum of the acoustic pressures measured by the microphones of a given sub-antenna are added up, taking into account their lag corresponding to the travel time between the calculation point and a microphone (STEP 2). Next, for each computation point, the pressure values obtained by addition are multiplied (STEP 3). Finally, the result obtained is represented, in a manner known of itself, in the form of a hologram on which the information on the source locations appears visually.

The angular offset between the sub-antennas and the processing of the information from the plurality of microphones, as defined above, particularly the multiplication operation, enables the influence of parasitic effects to be limited.

As seen above, for frequencies less than a given value, it may be advantageous not to perform the multiplication operation. This is why the source localization device can also be designed such that, for frequencies less than $f_c$, the hologram is established from the calculation, for each point on the hologram, by adding the acoustic pressures measured by the plurality of microphones of the entire antenna and not just of one sub-antenna, taking into account the acoustic pressure lag as before.

Figure 6:
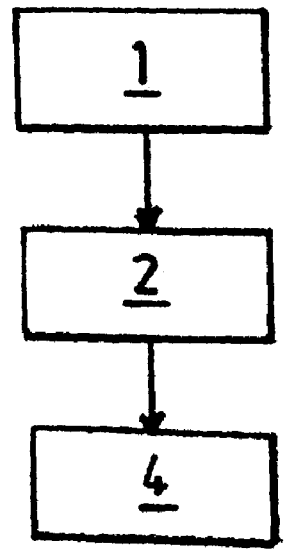
FIG. 6 is a block diagram showing the processing of the signals coming from the antenna microphones for a frequency lower than a given value $f_c$.

FIG. 6 describes such a device in which the multiplication step (STEP 3) has been eliminated. Therefore, all that is done is the data acquisition, i.e., measuring the acoustic pressures by the plurality of microphones (STEP 1), then the addition step as defined above (STEP 2), and the result is shown in the form of a hologram (STEP 4).

In the case of an antenna made of two sub-antennas, each made of two branches, additive processing occurs in each of first and second branches of first sub-antennas designated 1.1 and 1.2 and additive processing occurs in first and second branches of second sub-antenna branches named 2.1 and 2.2. The processing is dependent on the given value $f_c$.

Below $f_c$, the total processing done is 1.1+1.2+2.1+2.2 and above $f_c$ the total processing done is (1.1+1.2)×(2.1+2.2).

It goes without saying that the invention is not confined to the embodiments of this system shown, described above as an example, but on the contrary encompasses all variants. Thus, in particular, the number of branches can be greater than three, they can have different lengths, the sub-antennas can form irregular crosses or stars, i.e. be asymmetric, these sub-antennas can be offset by an angle other than half the angle between two branches, the sub-antennas can be non-coplanar, or the branches can be curved.

The invention claimed is:

1. A device for localizing acoustic sources and measuring their intensities, comprising:
    an antenna having at least two sub-antennas, each sub-antenna having at least two branches disposed in a cross shape or star shape, each branch being equipped with a plurality of microphones, and
    a signal processing unit that processes signals coming from the plurality of microphones; to establish, for a frequency higher than a given value $f_c$, an acoustic source hologram, the acoustic source hologram representing a distribution of acoustic pressures or intensities at different computation points on a given surface, the signal processing unit including;
    a calculation unit that calculates, for each computation point in the hologram, a sum of acoustic pressures measured by the plurality of microphones in a given sub-antenna, and taking into account a lag in acoustic pressures corresponding to a travel time between the calculation point and the plurality of microphones, multiplying the pressure values obtained by adding the acoustic pressures measured by the microphones of the various sub-antennas for each calculation point of the hologram.

2. The device according to claim 1, wherein the sub-antennas are disposed in parallel planes and are offset angularly.

3. The device according to claim 1, wherein the signal processing unit establishes an acoustic source hologram, for a frequency less than the value determined $f_c$, the calculation unit calculating, for each computation point of the hologram, the sum of the acoustic pressures measured by the antenna microphones, taking the lag in acoustic pressures into account.

4. The device according to claim 1, wherein the frequency value determined $f_c$ is equal to $(c \times D)/(p \times l)$ where c is the speed of sound, D is the distance between the object and the antenna, p is the distance between two microphones, and l is the length of the object to be analyzed.

5. The device according to claim 1, wherein the branches of a given sub-antenna have a regular angular distribution and that the sub-antennas are offset by an angle corresponding to a fraction of the angle between two branches.

6. The device according to claim 1, wherein the sub-antennas are offset by an angle corresponding to half the angle between two branches.

7. The device according to claim 1, wherein the signal processing unit is designed to process signals emitted by moving sources.

8. The device according to claim 1, wherein the branches of the sub-antennas are straight.

9. The device according to claim 1, wherein each branch has 7 to 30 microphones.

10. The device according to claim 1, wherein each branch is between 1 m and 20 m long.

11. The device according to claim 1, wherein the microphones are regularly distributed.

12. The device according to claim 1, wherein the microphones are identical.

* * * * *